(12) United States Patent
Cearns

(10) Patent No.: US 7,559,570 B2
(45) Date of Patent: Jul. 14, 2009

(54) TRAILER HITCH

(76) Inventor: Gary Cearns, 1888 N. US Hwy. 33, Decatur, IN (US) 46733

( * ) Notice: Subject to any disclaimer, the term of this patent is extended or adjusted under 35 U.S.C. 154(b) by 164 days.

(21) Appl. No.: 11/604,615

(22) Filed: Nov. 27, 2006

(65) Prior Publication Data

US 2008/0122199 A1 May 29, 2008

(51) Int. Cl.
*B60D 1/46* (2006.01)
(52) U.S. Cl. .................. 280/490.1; 280/495
(58) Field of Classification Search .......... 280/490.1, 280/478.1, 495
See application file for complete search history.

(56) References Cited

U.S. PATENT DOCUMENTS

| | | | | |
|---|---|---|---|---|
| 4,662,647 A | * | 5/1987 | Calvert | 280/490.1 |
| 5,975,553 A | * | 11/1999 | Van Vleet | 280/483 |
| 6,341,795 B1 | * | 1/2002 | Zerkel | 280/490.1 |
| D508,221 S | * | 8/2005 | Rebick | D12/162 |
| 2003/0222426 A1 | * | 12/2003 | Rosenlund | 280/490.1 |
| 2007/0096428 A1 | * | 5/2007 | Miles et al. | 280/490.1 |

* cited by examiner

*Primary Examiner*—Lesley D. Morris
*Assistant Examiner*—Tashiana Adams
(74) *Attorney, Agent, or Firm*—Timothy M. Barlow

(57) ABSTRACT

A trailer hitch draw bar includes a receiver tube with a square cross-section to fit into a receiver on a vehicle trailer hitch. A vertically-displaced collar is fixed to the receiver tube and includes a generally square, vertically-oriented aperture and at least one set of horizontal mounting holes. A vertically-adjustable elevation tube is positioned within the collar's aperture and includes a plurality of horizontal holes that index with the mounting holes in the collar. At least one mounting pin is inserted into the collar's mounting holes and the indexed holes in the elevation tube. A hitch ball pad is horizontally fixed to the top end or the bottom end of the elevation tube. A reversible hitch ball is attached to the hitch ball pad. The receiver tube, the elevation tube and the hitch ball are each separately invertible to accommodate any hitch elevation requirements while eliminating a dead zone.

10 Claims, 6 Drawing Sheets

TRAILER HITCH

FIELD OF THE INVENTION

The present invention relates generally to the field of automotive equipment and more particularly to a adjustable trailer hitch system for automobiles.

BACKGROUND OF THE INVENTION

Coupling a trailer to the hitch on a towing vehicle can be a tricky task. In addition to the physical coupling, the operator must ensure that the loads are distributed properly in both the trailer and the towing vehicle. Beyond that, the coupling between the trailer and towing vehicle must try to keep both loads as level as possible. This keeps the trailer and towing vehicle in the same plane, or parallel planes, and tends to keep the dynamic forces between the trailer and towing vehicle planar or parallel. Such an arrangement promotes safe control.

However, if the towing vehicle is not level, so that the trailer hitch is too high or too low, the trailer can introduce vertical forces into the towing vehicle. This problem is aggravated by a trailer geometry that places the tongue too high or too low, relative to the towing vehicle. Another problem is where the towing vehicle has a high hitch position, such as on a large truck, while the trailer is level only when the tongue is significantly lower than the hitch.

Fortunately for most consumers, most serious hitches are of the square receiver type. A draw bar with a ball mount slides into the receiver and it is pinned in place. Many draw bars are available with a fixed amount of drop, measured from the centerline of the receiver. The drop can be converted into rise if the draw bar is inverted and the ball is removed and installed to the opposite side. This is commonly done to compensate for disparate hitch and trailer tongue heights. The systems discussed above are fixed, that is, the drop or rise is built into the draw bar and cannot be changed. This works for many people with predictable loads and less-demanding towing situations, but is not sufficient for others.

An adjustable-height draw bar is necessary for those who want to have the safest possible towing situation. An adjustable-height draw bar can be adjusted to compensate for the variations that occur each time a trailer is coupled. This can be a big advantage where the tongue weight of the trailer varies considerably depending on its load, or where the towing vehicle has a much larger or smaller load than normal.

Several varieties of adjustable-height draw bars are on the market, but each has drawbacks. Some are adjustable only over a small range or in very large increments. All of them include a zero-elevation dead spot where it is impossible to adjust the center of the tow ball so that it is level with the square receiver. Existing designs require that the operator have a second draw bar to have the tow bal level with the square receiver.

Thus, what is desired is a trailer hitch system that provides quick and easy elevation adjustments of the trailer hitch with a trailer, and that eliminates the zero-elevation dead spot so that an operator needs only one adjustable draw bar for a wide range of elevation adjustments.

SUMMARY OF INVENTION

An adjustable trailer hitch draw bar includes a receiver tube with a vertically-displaced collar fixed at one end. The receiver tube has a square cross-section and is dimensioned to be inserted into and engage a receiver on a vehicle trailer hitch. The vertically-displaced collar is fixed to the receiver tube at the end away from the vehicle trailer hitch. The collar includes a generally square, vertically-oriented aperture with at least one pair of horizontal holes oriented on the left and right sides of the collar. The vertical displacement of the collar can be at least equal to the height of the receiver tube to provide a significant deviation from the horizontal centerline of the receiver tube.

An adjustable elevation tube is vertically positioned within the vertically-oriented aperture of the collar and includes a plurality of pairs of horizontal elevation holes that index with the holes in the collar. At least one mounting pin is inserted into and through the horizontal holes in the collar and the indexed elevation holes in the elevation tube.

A hitch ball pad is horizontally fixed to an end of the elevation tube and a hitch ball is removably attached to the hitch ball pad. The hitch ball pad may be at the top or the bottom of the elevation tube 22. No matter the orientation of the hitch ball pad, the entire elevation tube assembly can be removed from the collar and inverted so that the hitch ball pad may be reoriented. At least one drain port is incorporated into the elevation tube.

DETAILED DESCRIPTION OF THE DRAWINGS

Figure 1:
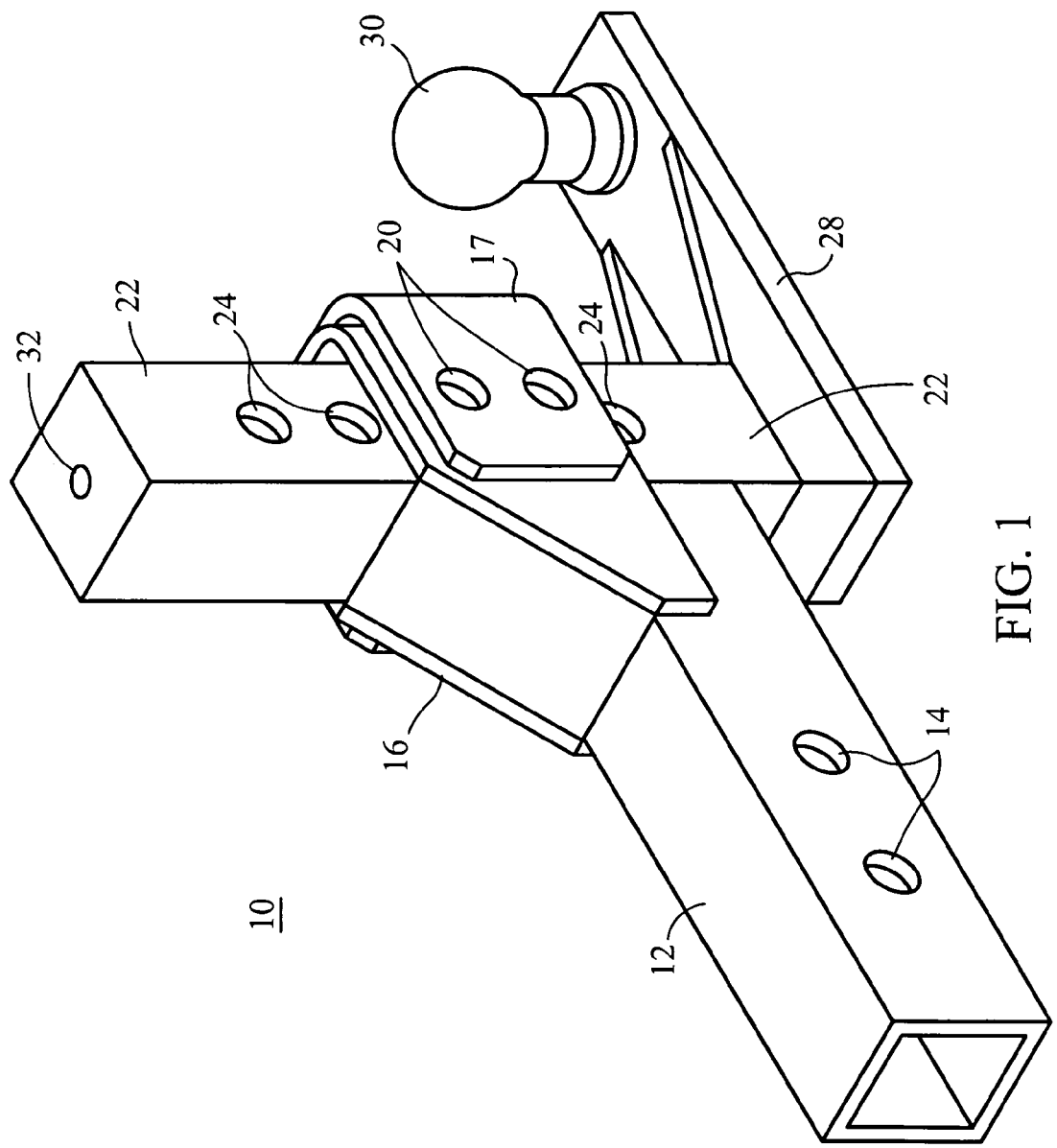
FIG. 1 is a perspective view of a trailer hitch system, in accordance with the present invention.

FIG. 1 is a perspective view of a trailer hitch draw bar system 10 that includes a receiver tube 12 that has a square cross-section and is sized to fit into a square receiver on a vehicle's trailer hitch (not shown). A number of holes 14 are provided in the receiver tube 12 to permit the receiver tube 12 to be pinned to the vehicle's trailer hitch.

Figure 2:
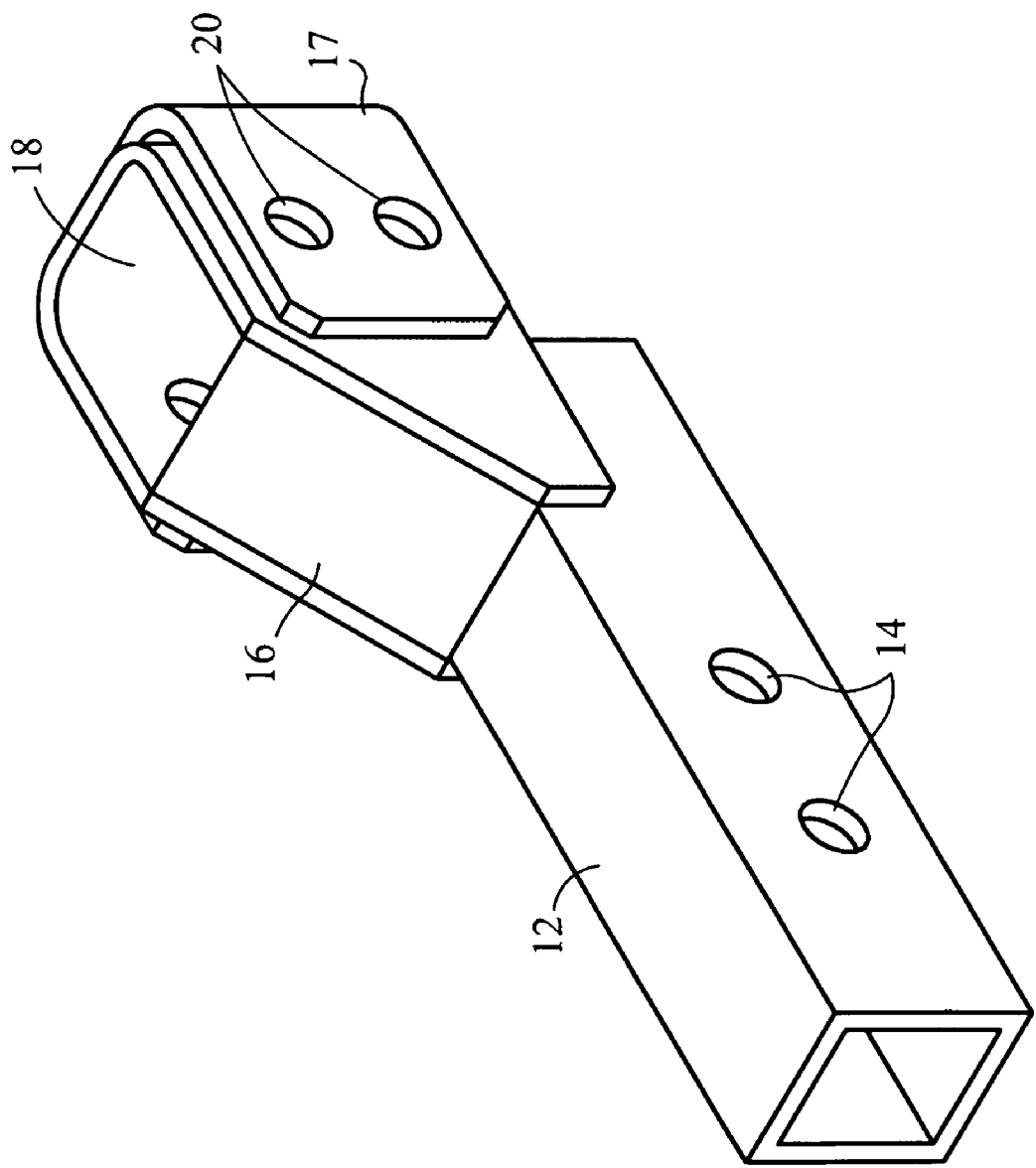
FIG. 2 is a perspective view of the receiver tube and collar for the trailer hitch system, in accordance with the present invention.

A vertically-displaced collar 16 is fixed to the receiver tube 12 at the end opposite the holes 14. The collar 16 includes a generally square, vertically-oriented aperture 18 and at least one pair of horizontal holes 20 oriented on the left and right sides of the collar 16. See FIG. 2. Two pairs of holes 20 are shown in a stacked arrangement. The collar 16 may include a reinforcing wrap 17 which will provide continuity for the holes 20 in the collar 16.

An elevation tube 22 is positioned within the vertically-oriented aperture 18 of the collar 16. The elevation tube 22 is vertically adjustable within the collar 16 and includes a plurality of pairs of horizontal elevation holes 24 that index with the collar holes 20. When properly indexed, at least one elevation pin 26 (see FIGS. 3 and 4) is inserted through the collar holes 20 and the elevation holes 24. Numerous elevation tube 22 position options are available using one or two pin elevation pins 26.

A hitch ball pad 28 is ruggedly braced and is attached in a generally horizontal orientation to an end of the elevation tube 22. A hitch ball 30 is attached to the hitch ball pad 28 and provides a mounting point for a trailer tongue (not shown). The hitch ball 30 may be removed to be replaced with a different ball, or to be reoriented. A drain port 32 is included at each end of the elevation tube 22 to reduce the likelihood of corrosion inside the elevation tube 22. Notice that, with the collar 16 up and with the elevation tube 22 inserted from the bottom, the hitch ball 30 can be raised so that it is about level with the centerline of the receiver tube 12. This is inconceivable with conventional adjustable trailer hitch design. It is possible only through creation of the offset collar 16. This design eliminates the dead spot, a spot having no available adjustment position, near the centerline of the receiver tube 12.

Figure 3:
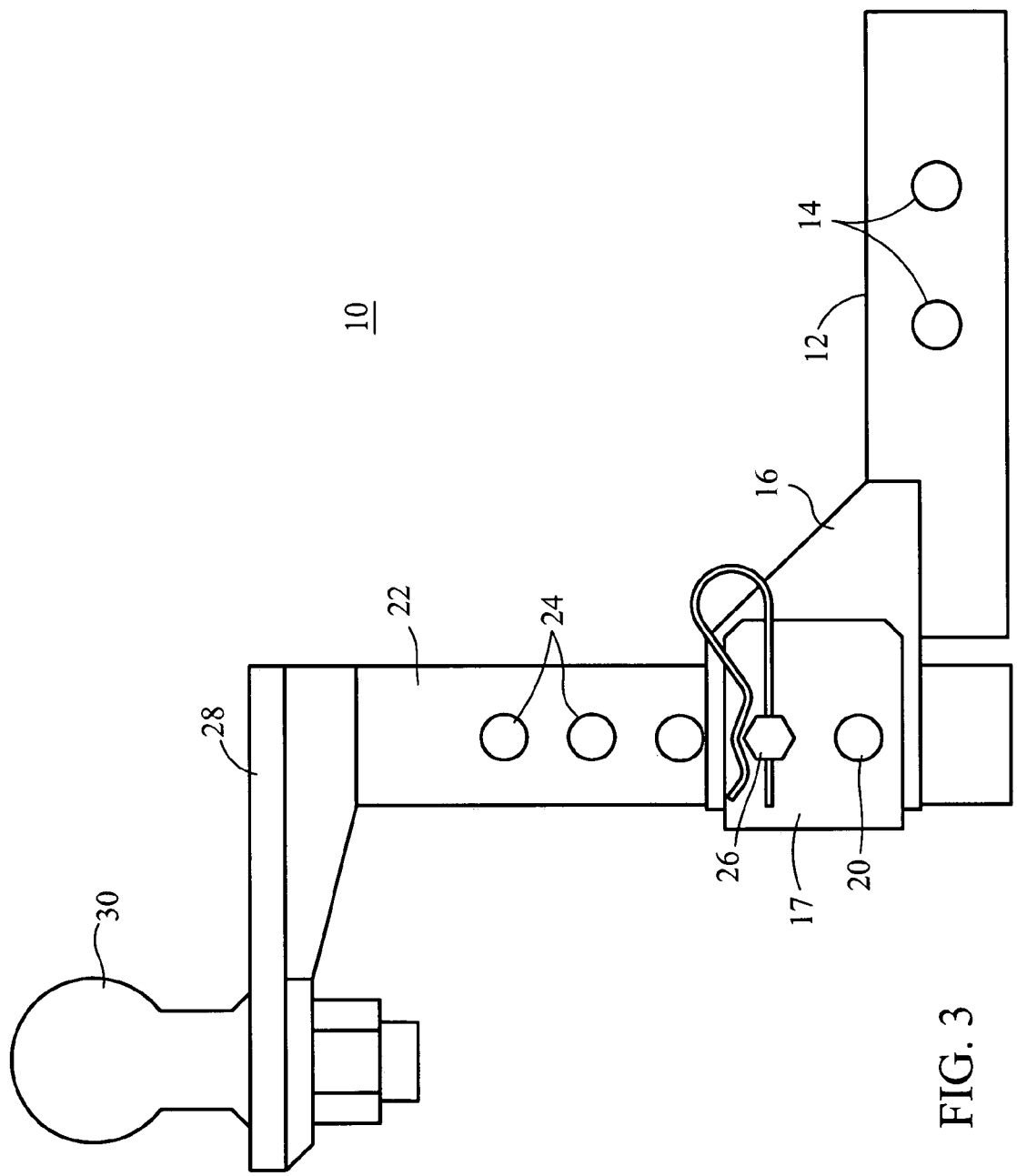
FIG. 3 is a side view of the trailer hitch system, in accordance with the present invention.

FIG. 3 is a side view of a trailer hitch system 10 in an altered configuration. In this embodiment, the receiver tube 12 and collar 16 are in the same orientation as shown in FIG. 1, but the elevation tube 22 assembly has been removed, inverted and reinserted into the collar 16 from above. This provides a superior range of elevation adjustment above the centerline of the receiver tube 12. Notice that the elevation tube 22 is doubled-pinned 26 through the collar 16 for extra strength and trouble-free operation. Of course, when the elevation tube 22 and hitch ball pad 28 are inverted, the hitch ball 30 must be removed and reoriented, as shown.

Figure 4:
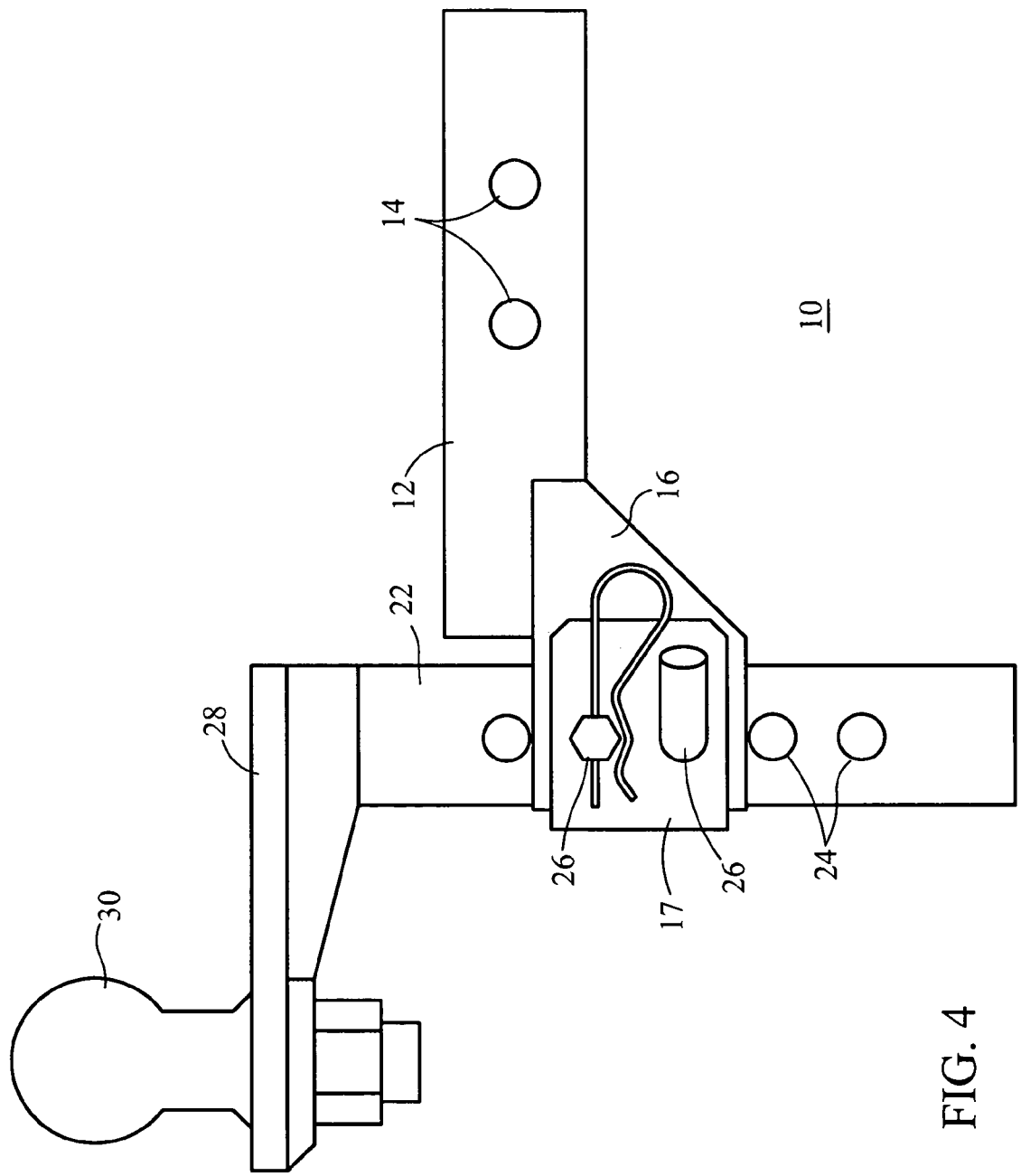
FIG. 4 is a perspective view of the trailer hitch system, in accordance with the present invention.

FIG. 4 is a side view of the hitch system 10 with the receiver tube 12 and collar 16 inverted from the orientation shown in FIG. 1. Notice that the elevation tube 22 and hitch ball pad 28 are inserted from the top of the vertically-displaced collar 16. This exemplifies another of the advantages of the trailer hitch system 10, in that the user can find the perfect elevation adjustment appropriate for his combination of towing vehicle, trailer, and load.

FIGS. 5A-H are side views of the trailer hitch system 10 in several different configurations to show its adaptability.

Figure 5A:
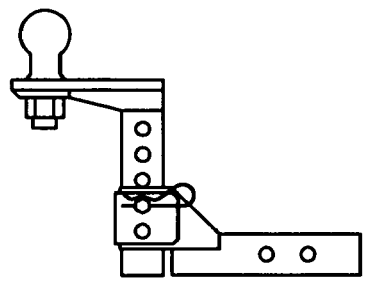
FIGS. 5A-H are side views of the trailer hitch system in a number of different configurations, in accordance with the present invention.

FIG. 5A shows the collar 16 up and the elevation tube 22 and hitch ball pad 28 inserted from the top and at maximum elevation.

Figure 5E:
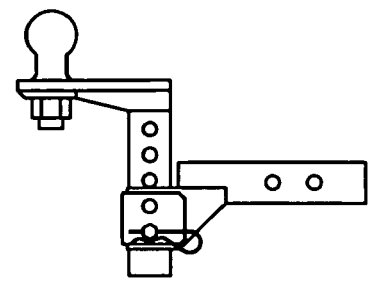
Figure 5B:
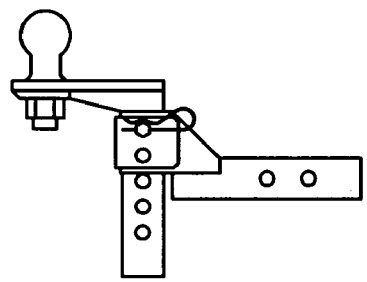

FIG. 5B shows the collar 16 up and the elevation tube 22 and hitch ball pad 28 inserted from the bottom and at minimum elevation.

Figure 5F:
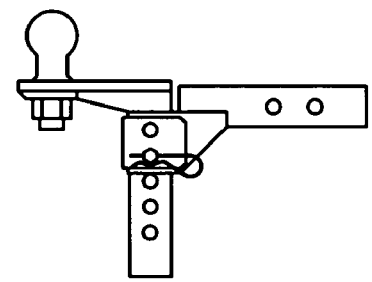
Figure 5C:
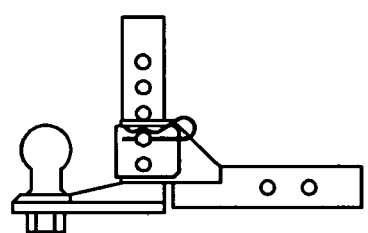

FIG. 5C shows the collar 16 up and the elevation tube 22 and hitch ball pad 28 inserted from the bottom and at maximum elevation. Notice how the hitch ball 30 is above the receiver tube 12. The ball 30 can be brought even with the receiver tube 12 or below the receiver tube 12 (see FIG. 5D) simply by pulling the pins 26 and adjusting the elevation tube 22.

Figure 5G:
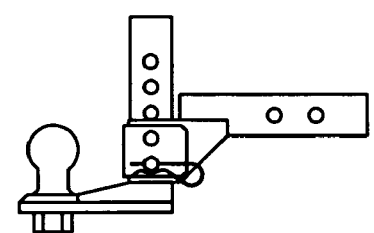
Figure 5D:
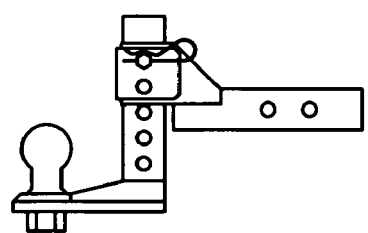

FIG. 5D shows the collar 16 up and the elevation tube 22 and hitch ball pad 28 inserted from the bottom and at maximum drop.

FIG. 5E shows the collar 16 down and the elevation tube 22 and hitch ball pad 28 inserted from the top and at maximum elevation.

FIG. 5F shows the collar 16 down and the elevation tube 22 and hitch ball pad 28 inserted from the top and at minimum elevation.

FIG. 5G shows the collar 16 down and the elevation tube 22 and hitch ball pad 28 inserted from the bottom and at maximum elevation.

Figure 5H:
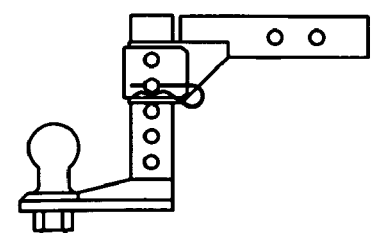

FIG. 5H shows the collar 16 down and the elevation tube 22 and hitch ball pad 28 inserted from the bottom and at maximum drop.

Notice the wide range of possible adjustment positions that are available. Also notice the overlap of hitch ball positions, or from another perspective, notice the lack of a dead spot in the adjustment positions. In particular, notice that the hitch ball 30 can be placed very close to the level of the receiver tube 12, as shown in FIGS. 5C and 5F. Some combination of collar 16 orientation and elevation tube 22 orientation will satisfy virtually every user. There are numerous intermediate positions available for the elevation tube 30. Not all possible configurations are shown, but are included within the adjustable range of this device.

Operation

Figure 6:
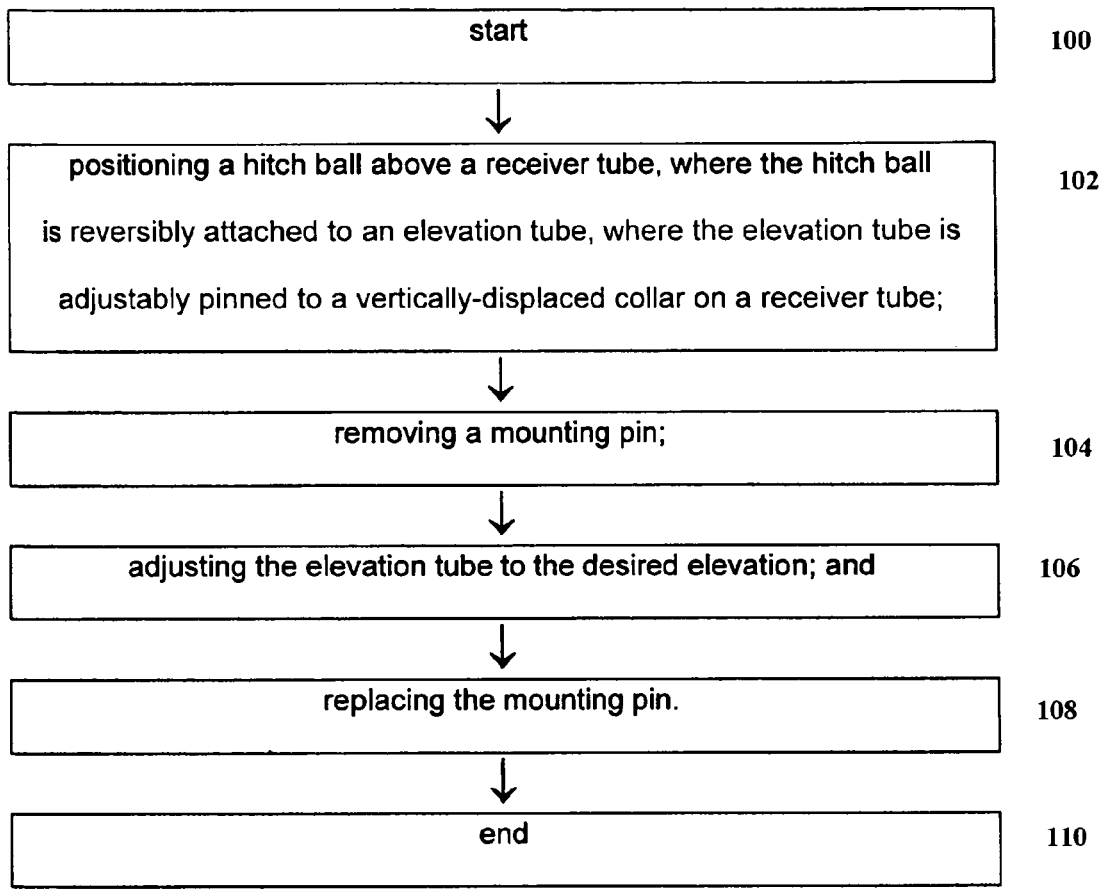
FIG. 6 is a flowchart for operation of the trailer hitch system, in accordance with the present invention.

FIG. 6 is a flowchart for adjusting the trailer hitch draw bar. The process starts, step 100, by positioning a hitch ball 30 above a receiver tube 12, where the hitch ball 30 is reversibly attached to an elevation tube 22, where the elevation tube 22 is adjustably pinned to a collar 16 on a receiver tube 12, step 102. The receiver tube 12 may be oriented so that the collar 16 is up or down. Next, step 104, the user removes an elevation pin 26 and adjusts the elevation tube 22 to the desired elevation, step 106. Finally, step 108, the user replaces the elevation pin 26, ending the process at step 110.

The trailer hitch system 10 is truly unique in that the hitch ball 30 may be placed within three distinct zones. First, the elevation tube 22 may be lowered or adjusted to a position where the hitch ball 30 is level with the receiver tube 12. Second, the elevation tube 22 may be lowered or adjusted to a position where the hitch ball 30 is below level with the receiver tube 12. Third, the elevation tube 22 may be adjusted to a position where the hitch ball 30 is above level with the receiver tube 12. These three major positions may be accomplished with by simply reorienting the components of the hitch system 10.

The reorientation of the components can occur via a couple of different processes, including: removing the elevation tube 22 from the collar 16; inverting the elevation tube 22; and inserting the elevation tube 22 into the collar 16. If the elevation tube 22 is lifted up to remove it from the collar 16, then it must be inserted from the bottom when the elevation tube 22 is inverted.

When the elevation tube 22 is removed and inverted, the hitch ball 30 must also be reoriented via the process of: removing the hitch ball 30 from the elevation tube 22; inverting the elevation tube 22; and attaching the hitch ball 30 to the elevation tube 22. Thus, the hitch ball 30 will always be on the top side of the hitch ball pad 28.

Of course, because the receiver tube 12 is a generally square component, it can be inverted as well. This maneuver alters the orientation of the collar 16 and enables a number of additional possible hitch ball 30 positions.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A trailer hitch draw bar comprising:
   a receiver tube, having a square cross-section and dimensioned to insertably engage at a first end a receiver on a vehicle trailer hitch;
   a vertically-displaced collar fixed to the receiver tube at a second end, the collar comprising a generally square, vertically-oriented aperture, the collar further comprising at least one pair of horizontal holes oriented on a left side and a right side of the collar;
   an elevation tube adjustably vertically positioned within the vertically-oriented aperture of the collar, the elevation tube comprising a plurality of pairs of horizontal elevation holes that index with the holes in the collar;

at least one mounting pin inserted into the horizontal holes in the collar and the indexed elevation holes in the elevation tube;

a hitch ball pad horizontally fixed to an end of the elevation tube; and a hitch ball removably attached to the hitch ball pad.

2. The trailer hitch draw bar of claim 1, further comprising two pairs of horizontal holes on the collar.

3. The trailer hitch draw bar of claim 2, further comprising two mounting pins inserted into the horizontal holes in the collar and the indexed elevation holes in the elevation tube.

4. The trailer hitch draw bar of claim 1, where the hitch ball pad is horizontally fixed to atop end of the elevation tube.

5. The trailer hitch draw bar of claim 2, where the hitch ball pad is horizontally fixed to a lower end of the elevation tube.

6. The trailer hitch draw bar of claim 5, where the elevation tube is removably attached inside the collar in a inverted position.

7. The trailer hitch draw bar of claim 1, where the hitch ball is removably attached to the hitch ball pad in a inverted position.

8. The trailer hitch draw bar of claim 1, where the collar is vertically-displaced upward in relation to a horizontal centerline of the receiver tube;

9. The trailer hitch draw bar of claim 8, where the receiver tube is removably inserted into the receiver on a vehicle trailer hitch in a inverted position.

10. The trailer hitch draw bar of claim 1, where the elevation tube comprises at least one drain port.

* * * * *